(12) United States Patent
Argue et al.

(10) Patent No.: US 9,928,542 B2
(45) Date of Patent: Mar. 27, 2018

(54) REAL-TIME CONGESTION AVOIDANCE IN A RETAIL ENVIRONMENT

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

(*) Notice: Subject to any disclaimer, the term of this patent is extended or adjusted under 35 U.S.C. 154(b) by 558 days.

(21) Appl. No.: 14/473,770

(22) Filed: Aug. 29, 2014

(65) Prior Publication Data

US 2016/0063610 A1    Mar. 3, 2016

(51) Int. Cl.
*G06Q 30/00* (2012.01)
*G06Q 30/06* (2012.01)
*G06Q 10/04* (2012.01)

(52) U.S. Cl.
CPC ......... *G06Q 30/0639* (2013.01); *G06Q 10/04* (2013.01); *G06Q 10/047* (2013.01); *G06Q 30/0633* (2013.01); *G06Q 30/0641* (2013.01)

(58) Field of Classification Search
CPC .......... G06Q 30/0639; G06Q 30/0633; G06Q 30/0205; G06Q 10/08355
USPC ...................................... 705/26.8
See application file for complete search history.

(56) References Cited

U.S. PATENT DOCUMENTS

| 6,123,259 | A | 9/2000 | Ogasawara |
| 6,587,835 | B1 | 7/2003 | Treyz |
| 6,895,330 | B2 * | 5/2005 | Cato .................. G01C 21/20 235/375 |
| 8,676,657 | B2 | 3/2014 | Fenton |
| 2004/0093274 | A1 | 5/2004 | Vanska |
| 2006/0059049 | A1 | 3/2006 | Morris |
| 2006/0289637 | A1 | 12/2006 | Brice |

(Continued)

FOREIGN PATENT DOCUMENTS

| CN | 103593785 A | 2/2014 |
| WO | WO2007/072389 A1 | 6/2007 |

(Continued)

OTHER PUBLICATIONS

Satyabrata Pradhan et al. "Wish List Based Shopping Path Discovery and Profitable Path Recommendation", 2012 Third International Conference on Services in Emerging Markets © 2012 IEEE, pp. 101-106.*

*Primary Examiner* — Naeem U Haq
*Assistant Examiner* — Jason B Warren
(74) *Attorney, Agent, or Firm* — Bryan Cave LLP

(57) ABSTRACT

A shopping list may be ordered in order to guide a shopper through a store in an efficient manner. Congestion in the store may be identified, such as using security camera footage. The shopping list may be reordered in order to avoid congested areas in the store. Expected areas of congestion may be determined based on velocities and maneuverability of other shoppers. Maneuverability of other shoppers may be estimated by analyzing video data and determining attributes of the other shoppers, such as whether they are pushing a cart or have children. The shopping list may be presented with directions to the locations of items within the store and may be periodically reordered throughout the shopper's visit responsive to detected congestion.

26 Claims, 7 Drawing Sheets

(56) References Cited

U.S. PATENT DOCUMENTS

| | | | |
|---|---|---|---|
| 2008/0154720 A1* | 6/2008 | Gounares | G01C 21/343 705/14.4 |
| 2008/0186193 A1* | 8/2008 | Toyokawa | G06Q 30/02 340/670 |
| 2009/0319182 A1 | 12/2009 | Monteverde | |
| 2010/0121567 A1 | 5/2010 | Mendelson | |
| 2011/0225068 A1* | 9/2011 | Figueroa | G06F 17/30241 705/27.1 |
| 2012/0239504 A1* | 9/2012 | Curlander | G06Q 30/02 705/14.66 |
| 2012/0259732 A1 | 10/2012 | Sasankan | |
| 2013/0030915 A1 | 1/2013 | Statler | |
| 2013/0065520 A1 | 3/2013 | Skutnick | |
| 2013/0103539 A1* | 4/2013 | Abraham | G06Q 10/04 705/26.8 |
| 2013/0166193 A1 | 6/2013 | Goldman | |
| 2013/0191193 A1* | 7/2013 | Calman | G06Q 30/00 705/14.4 |
| 2013/0332273 A1 | 12/2013 | Gu | |
| 2014/0019300 A1 | 1/2014 | Sinclair | |
| 2014/0229320 A1* | 8/2014 | Mohammed | G06Q 30/0639 705/26.7 |
| 2015/0120514 A1* | 4/2015 | Deshpande | G06Q 10/08355 705/28 |
| 2015/0227890 A1* | 8/2015 | Bednarek | G06Q 10/08355 705/26.81 |

FOREIGN PATENT DOCUMENTS

| | | | |
|---|---|---|---|
| WO | WO 2009117162 A1 * | 9/2009 | G06Q 30/02 |
| WO | WO2013186347 A1 | 12/2013 | |

\* cited by examiner

REAL-TIME CONGESTION AVOIDANCE IN A RETAIL ENVIRONMENT

BACKGROUND

Field of the Invention

This invention relates to systems and methods for providing in-store directions to shoppers.

Background of the Invention

The global positioning system (GPS) has been widely used to provide turn-by-turn directions to drivers. Some attempts have been made to use GPS to provide similar turn-by-turn directions in a shopping environment. However, such attempts have been ineffective due to one or both of limited reception in a store and the limited accuracy of GPS receivers on the scale needed to locate items in a store. Other approaches such as RFID or BLUETOOTH beacons have also been used, but likewise lack the needed accuracy.

The systems and methods described herein provide an improved approach for providing in-store directions.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
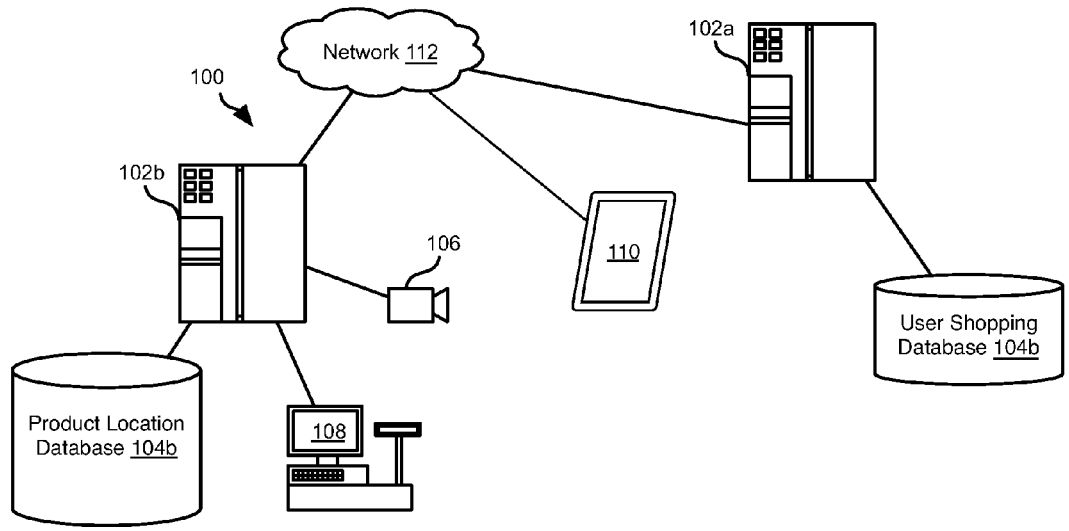
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. A shopping list may be ordered in order to guide a shopper through a store in an efficient manner. Congestion in the store may be identified, such as using security camera footage. The shopping list may be reordered in order to avoid congested areas in the store. Congestion may be actual congestion or expected congestion based on the velocity of other shoppers.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates a network environment 100 in which the systems and methods disclosed herein may be implemented. For example, a server system 102a may host a user shopping database 104a that stores data in user accounts for a plurality of users. A user account may store such information as records of past transactions by a user, a shopping list of the user, recommended products or shopping lists for a user, or the like. A shopping list may be a list of items selected by the user and transmitted to the server system 102a, which then stores the list in the account of the user.

The same or a different server system 102b may store a product location database 104b for a retail establishment. Alternatively, the product location database 104b may be hosted or accessed by the server system 102a. A product location database 104b may map a product identifier to a location in the retail establishment. For example, a product identifier may be mapped to a shelf identifier and a shelf identifier may be mapped to a physical location in the retail establishment, e.g. in the form of globally defined coordinates or with respect to some local datum point in the retail establishment.

The server system 102b may also access or receive video data from one or more security cameras 106 at the retail establishment. Again, in some embodiments video feeds form the one or more security cameras 106 may be received by the server system 102a. The server system 102b may be in data communication with one or more point of sale (POS) devices 108 that receive payment and transmit transaction records to the server system 102b indicating items purchased and prices paid.

A user having an account in the user shopping database 104b may add items to a shopping list using a mobile computing device 110. For example, a user may navigate a web interface to a product database, select products in the interface, and invoke transmission of identifiers of the selected products to the server system 102a for addition to the shopping list of the user. Although the methods disclosed herein are described as being performed on behalf of a user on one or both of the server systems 102a, 102b, in some embodiments, data for performing the disclosed methods may be provided to the mobile computing device 110, which then performs some or all of the steps of the disclosed methods. The mobile computing device 108 may be embodied as a cell phone, tablet computer, wearable computing device, or some other computing device.

The server systems 102a, 102b and mobile computing device 110 may communicate with one another by means of a network 112, such as a local area network (LAN), wide area network (WAN), the Internet, or some other network. The data connection between the server systems 102a, 102b and mobile computing device 110 may include any wired or wireless protocol.

Figure 2:
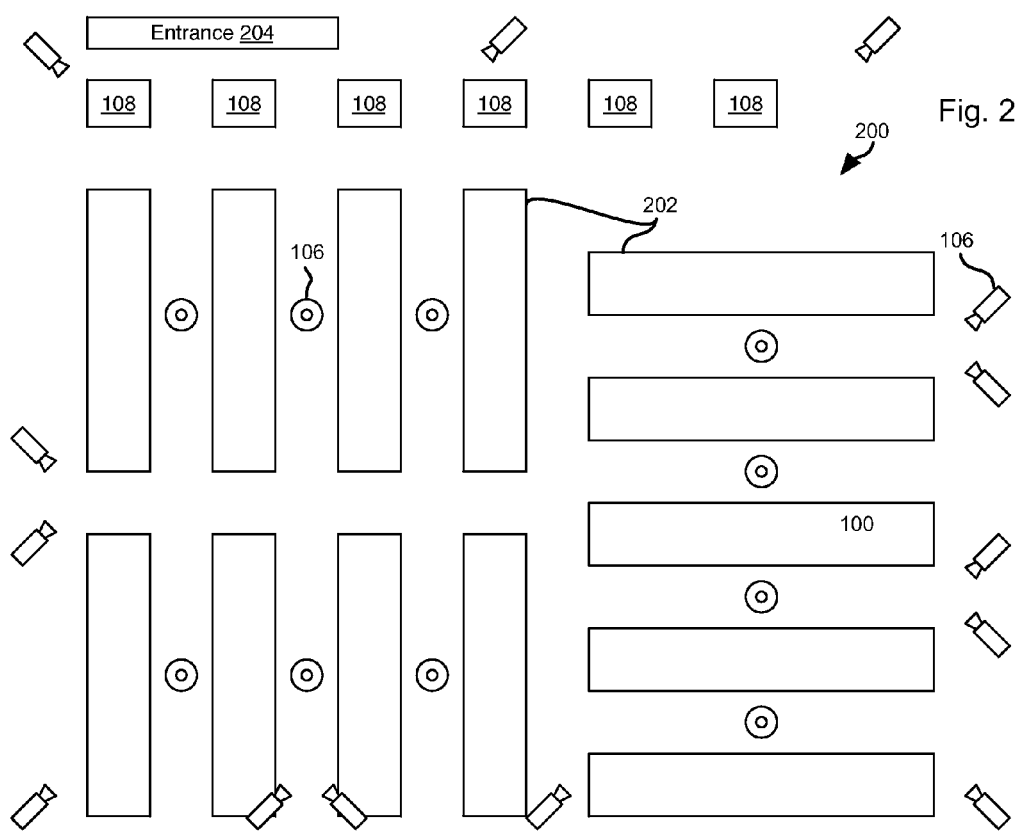
FIG. 2 is a schematic diagram of a retail environment including a plurality of security cameras suitable for use in accordance with embodiments of the present invention.

FIG. 2 illustrates a floor plan 200 of a retail establishment. The floor plan 200 may include shelving 202 and other displays or structures for storing goods. The locations of the shelving 202 and other displays or structures may be included in an electronic representation floor plan. The security cameras 106 may be distributed around the floor plan 200, typically in the ceiling, such that all or most of the floor plan is in the field of view of at least one of the security cameras 106. Some of the security cameras may have a large field of view, e.g. on the order of 360 degrees, in order to reduce the number of cameras 106 needed to place all or substantially all of the floor plan 200 in the field of view of at least one camera 106. The floor plan 200 may include one or more POS 108 locations and a location of one or more entrances 204 to the retail establishment. Again, the position of the entrance 204 and the POS stations 108 may be in an electronic representation of the floor plan 200.

Figure 3:
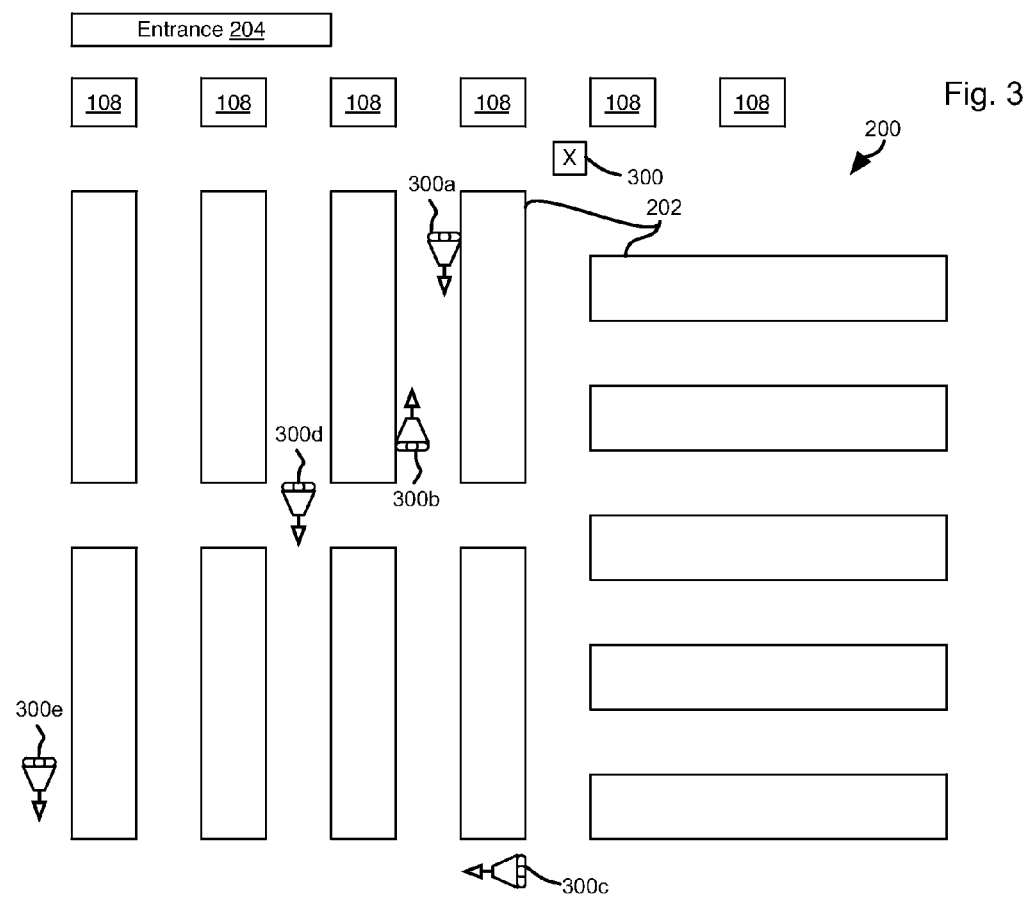
FIG. 3 is a schematic block diagram of the retail environment having a plurality of shoppers moving throughout.

Referring to FIG. 3, the methods disclosed herein may be understood with respect to a "guided shopper" 300 for whom a shopping list is ordered and re-ordered and "other shoppers" 300a-300e that may be present in the retail establishment and cause congestion along a path of the guided shopper. The position of the guided shopper 300 and other shoppers 300a-300e may be determined from the video output of the security cameras 106. The position of the guided shopper 300 may be determined by determining a location of a mobile computing device 110 of the user by any means known in the art, such as GPS, proximity to a beacon such as a BLUETOOTH, RFID, or some other type of beacon. The position of the guided shopper 300 may also be inferred on the mobile computing device 110 by receiving checking off of an item on the list by the user. Specifically, the user may be inferred to be at the location of a checked off item in the floor plan 200 upon receiving check off of that item on the mobile computing device.

In a similar manner, a speed of the guided shopper may be inferred from the time of check off of the last two items for which check offs were received and the locations of the items checked off, e.g. where item 1 is located at position X1 and was checked off at time T1 and item 2 is located at position X2 and was checked off at time T2, the guided shopper's speed may be inferred to be $P(X1, X2)/(T2-T1)$, where P(X1, X2) is the length of a path (e.g. the shortest) among the obstacles of the floor plan 200 and likely to traveled by the guided shopper between positions X1 and X2.

The locations and velocities (direction and speed) of other shoppers 300a-300e may be determined from the video outputs of the one or more security cameras 106. The methods by which a portion of an image is identified as a shopper and movement of the shopper from one frame to the next is identified may be performed according to any image processing method known in the art.

In some embodiments, the location of the guided shopper 300 may likewise be inferred from video data. For example, using image recognition, the guided shopper 300 maybe identified in the video data and the location in the field of view of the camera in which the guided shopper 300 may be obtained. Alternatively, upon receiving check off of an item, the video data having the display location of that item in the field of view may be evaluated to identify the guided shopper 300. Thereafter, the movement of the shopper within the field of view of one or more cameras may be tracked.

Figure 4:
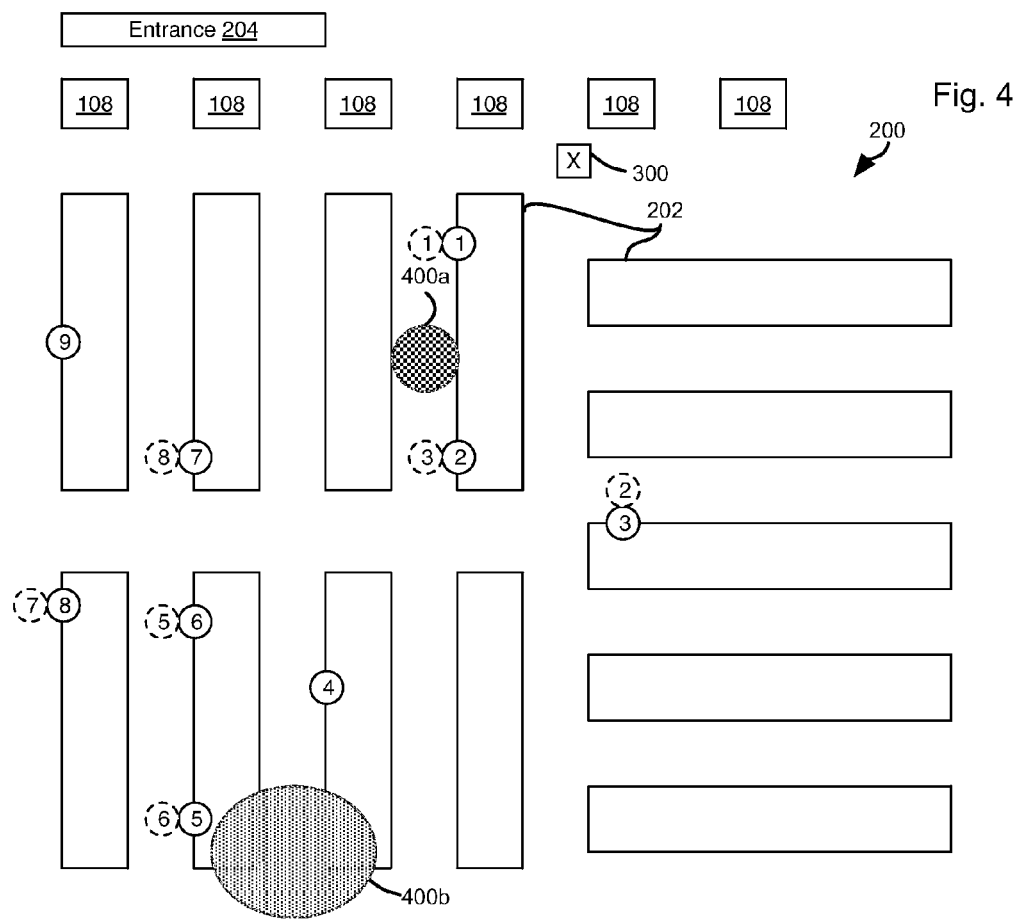
FIG. 4 is a schematic block diagram of the retail environment having areas of congestion highlighted and orderings of items displayed.

Referring to FIG. 4, while still referring to FIG. 3, the velocities and locations of the other shoppers 300a-300e may be used to identify the location of actual congestion and/or the location and time of expected congestion. For example, as is apparent in FIG. 3, other shoppers 300a-300b will cross paths within the aisle in which they are traveling. Accordingly, the area of congestion 400a may be identified as the point at which they cross and will block the aisle. Likewise, shoppers 300c-300e may have velocities such that they will converge at area of congestion 400b.

Solid solid circles 1 through 9 indicate the locations of items in a shopping list of the user. The number of each circle indicates the order in which the item is placed in a shopping list in order to conform to an optimal or near optimal path through the floor plan 200, i.e. the shortest or near shortest path through the floor plan. In response to detecting the congestion areas 400a, 400b, the ordering of the items may be changed in order to avoid guiding the guided customer to be at the congestion areas 400a, 400b at their expected time of occurrence, e.g. within some time interval (e.g. one to ten seconds) including the expected time of occurrence (e.g. centered on the expected time of occurrence, starting at the expected time of occurrence, or ending at the expected time of occurrence).

For example, in response to determining that guiding the original ordering of circles 1, 2, and 3 would require the user to pass through congestion area 400a at its time of occurrence, the ordering may be changed to that shown by the dotted circles, such that the formerly third item picked up is now the second item picked up and the formerly second item picked up is now the third item to be picked up. Whether a path will pass through an area of congestion 400a may be determine based on the inferred location of the guided shopper 300 and the inferred velocity of the guided shopper 300, i.e. the time at which the user will arrive at the area of congestion when moving at the inferred velocity may be compared to an expected time of occurrence of the congestion 400a. If the time of arrival is within the window including the expected time, then the ordering may be changed.

Likewise, in response to determining that an ordering of items would guide the guided shopper through congestion area 400b, the ordering may be changed such that the formerly fifth item is now the sixth item, the formerly sixth item is now the fifth item, the formerly seventh item is now the eight item, and the formerly eighth item is now the seventh item, as shown.

The process of identifying expected areas of congestion and changing the ordering may be repeated periodically while the guided shopper 300 is in the store, i.e. until the guided shopper arrives at a point of sale 108 or leaves the store.

Figure 5:
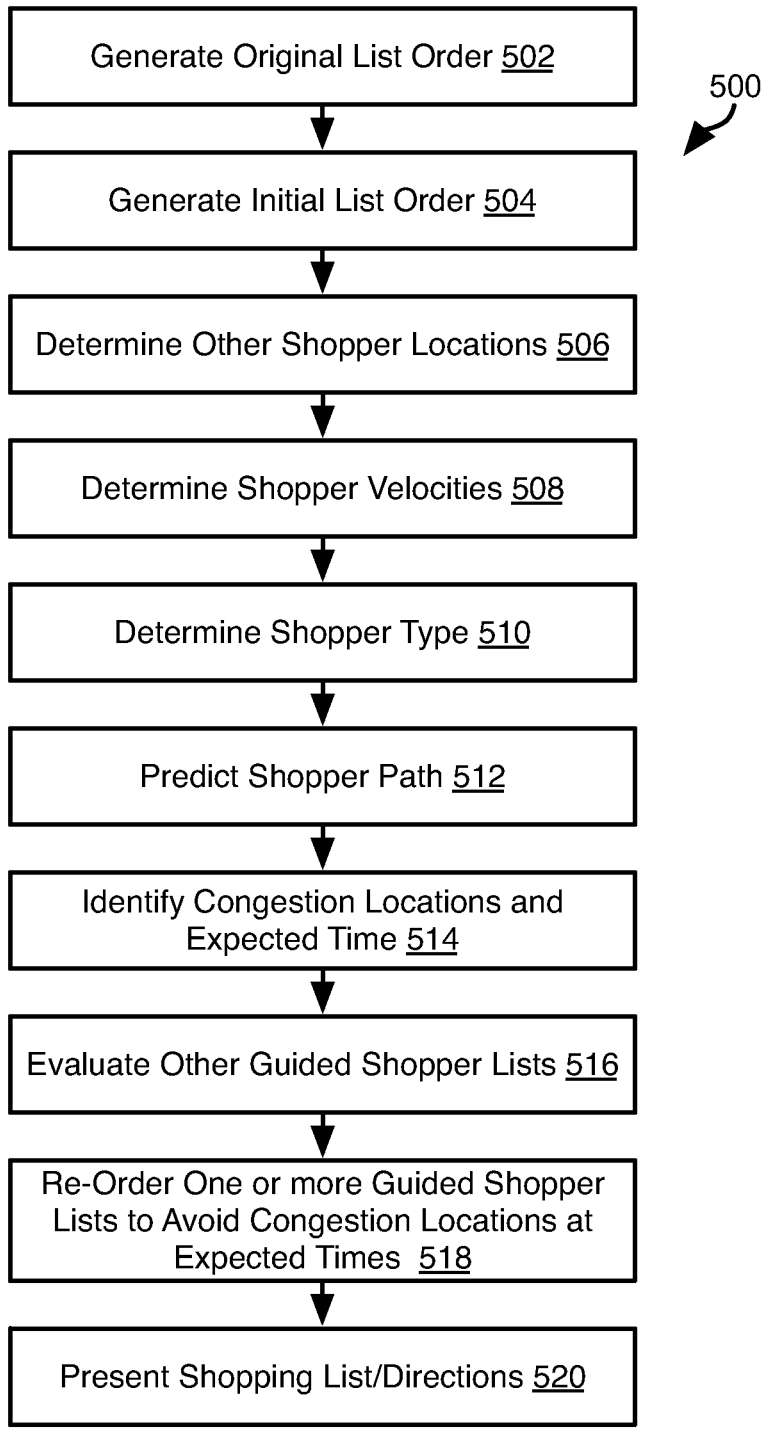
FIG. 5 is a process flow diagram of a method for re-ordering a shopping list according to real-time congestion data in accordance with an embodiment of the present invention.

FIG. 5 illustrates a method 500 that may be performed with respect to a guided shopper 300. As noted above, the method 500 may be performed on the server system 102a and/or 102b with an interface on a mobile computing device 110. Some or all of the processing of the method 500 may also be performed on the mobile computing device 110.

The method 500 may include receiving 502 a shopping list from the user and generating 504 an original list order. The original list may be based on the layout of the floor plan 200 and the locations of items of the list without reference to actual or expected congestion. The original list order may be selected to provide the shortest or relatively shortest path among a plurality of possible paths passing by the locations of items in the shopping list. Other criteria may also be used to select the original list. For example, the ordering may be selected such that refrigerated or frozen items are nearer to the end of the list while still selecting a path that is shorter relative to other possible paths. Generating 502 the original list may include generating directions to the locations of items on the list within the floor plan 200.

The method 500 may further include determining 506 the locations of other shoppers and determining 508 the velocity of other shoppers in video data from the security cameras 106. The method 500 may further include determining 510 the types of other shoppers. Possible types may include a shopper pushing a cart, a shopper pushing a cart with children, a shopper without a cart but with children, a shopper without a cart or children, and the like. Determining the type of a shopper may facilitate determining the expected path of the shopper. Specifically, a shopper with a cart and children may be less maneuverable than other shoppers and therefore less able to avoid obstacles and therefore more likely to cause congestion when converging with other shoppers. Accordingly, determining shopper type may include determining the other shopper's maneuverability, which may be represented as a numerical value used to identify the time and location of expected congestion.

The method 500 may further include determining predicted paths 512 for the other shoppers and the guided shopper. The predicted path of the guided shopper may, for example, include the shortest path from the shopper's inferred current location and the location of the next item in the shopping list as currently ordered. The predicted path of the other shoppers may include a path followed by the other shopper in the velocity determined by the other shopper. Where the path of another shopper according to the determined velocity thereof may pass through an obstacle of the floor plan 200 or the expected location of some different shopper. Accordingly, the predicted path for the shopper may be adjusted to avoid the obstacle or different shopper.

In some embodiments, the predicted path of an other shopper may be based on a characterization of the other shopper's behavior. For example, video data may be analyzed to identify the entry of a shopper into the store. The video data may be analyzed in order to track the shopper's movements throughout the shopper's visit. The shopper's behavior, such as speed, reaction time, and maneuverability may be characterized from the observed behavior and used to predict the path followed by the shopper, at least for a short time period, e.g. 10 to 60 seconds ahead of the current time, or some other time window.

The method 500 may include identifying 514 expected occurrences of congestion including the time and location of the floor plan 200 at which congestion is expected. Expected congestion may be determined based on the proximity of predicted paths of other shoppers to one another and the maneuverability of the other shoppers. For example, the floor plan may be divided into discrete areas. The likelihood of congestion occurring at a discrete area of the plurality of areas may be a function of the number of predicted paths of other shoppers that pass over the area within some temporal proximity to one another and the maneuverability of the other shoppers. For example, for a plurality of shoppers 1 to N each having a path Pi, passing over the discrete area within some time window Ti, and having a maneuverability of Mi, i=1 to N, the likelihood of congestion may be a function C(Ti, Mi) that increases with the overlap in the time windows Ti of the other shoppers and decreases with the maneuverability of the other shoppers (i.e. the more maneuverable the other shopper the less likely congestion is to occur).

The method 500 may include re-ordering 518 one or more guided shopper lists in order to reduce the likelihood of the one or more guided shoppers encountering the identified areas of congestion at their time of occurrence as compared to the likelihood of the one or more guided shoppers encountering the identified areas of congestion as the lists were ordered prior to the re-ordering 518. Re-ordering 518 the one or more guided shopping lists may include re-ordering the items of the shopping list that have not yet been checked off as having been retrieved. Re-ordering 518 a guided shopping list may include generating directions from the location of one item on the list to a next item on the list within the floor plan 200.

In one example, the method 500 is executed with respect to an individual guided shopper 300 such that the items of that guided shopper's list are re-ordered to lie on a path that reduces avoids the identified areas of congestion or reduces the likelihood of the guided shopper 300 encountering the identified areas of congestion.

In some instances, the method 500 may be executed with respect to multiple guided shoppers 300. Accordingly, the lists of the multiple guided shoppers 300 may be re-ordered to both 1) reduce the likelihood of the guided shopper's encountering identified congestion locations and 2) reduces the likelihood of the routes selected for the multiple guided shopper's resulting in congestion. The re-ordered lists may then be transmitted or otherwise presented one the mobile computing devices 110 of the guided shoppers 300. Some or all of steps 506-520 may be performed periodically for a guided shopper, such as until the shopper arrives at a POS 108 or leaves the retail establishment.

Figure 6:
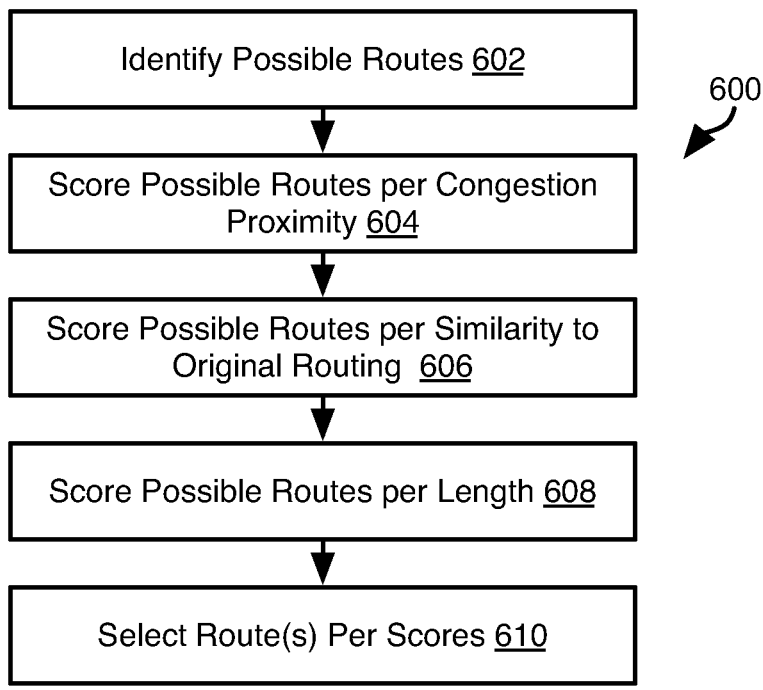
FIG. 6 is a process flow diagram of a method for selecting a path of a plurality of possible paths in accordance with an embodiment of the present invention.

FIG. 6 illustrates an example method 600 that may be used to determine a re-ordered path for retrieving the remaining items of a shopping list of a guided shopper that have not yet been checked off as having been retrieved.

The method 600 may include identifying 602 some or all possible routes through the floor plan 200 from the guided shopper's current location and that pass by the locations of the remaining items in the shopping list. The possible routes may then be assigned one or more scores. For example, a path may be assigned 604 a score based on temporal and physical proximity to identified areas of congestion. For example, a route may include a plurality of segments. Each segment of each possible route passes over a discrete area of the floor plan. The time window within which the guided shopper is expected to traverse a particular segment may be compared to an expected time or time window of any congestion expected for that discrete area. Accordingly, the score may increase with the difference between the time window in which the guided shopper traverses the discrete area and the time, or time window, within which congestion is expected at the discrete area. The score of a possible route may be a sum of such scores for the various segments of the route. Other functions or approaches for scoring a path may be used to determine the scores of possible paths at step 604 and that increase the score with temporal and/or locational offset from identified areas of congestion.

The method 600 may include scoring 606 possible routes according to similarity to an original route. In particular, it may be undesirable to rapidly switch orderings or require a user to become familiar with a constantly changing ordering. Accordingly, among the possible routes, those that are most similar to the original routing may be scored more highly than those that are less similarity. Similarity may be measured in terms of position. For example, if a given item is the Nth item on the original route and is the Mth item in a possible route, then the score for that possible route may be increase with a decrease in the value Abs(M−N).

The method 600 may include scoring 608 possible routes according to one or more other criteria for route optimization. For example, possible routes may be assigned 508 a score based on length, complexity, how close refrigerated items are to the end of the route, or some other criteria.

The scores for the possible routes calculated at steps 604-608 for each of at least a portion of the possible routes may be summed, weighted and summed, or otherwise combined to achieve a final score for the each possible route. One of the possible routes may then be selected 610 and the item ordering according to the selected route may be selected as the re-ordering for the shopping list.

As noted above, in some embodiments, the re-orderings of multiple shopping lists for multiple guided shoppers 300 at the same time. Accordingly, step 610 may include selecting routes for the multiple guided shoppers. For example, a set of routes including a route for each guided shopper of the multiple guided shoppers may be selected such that the sum of the final scores of the routes of the set is maximum or larger than for some or all other possible sets of routes.

Figure 7:
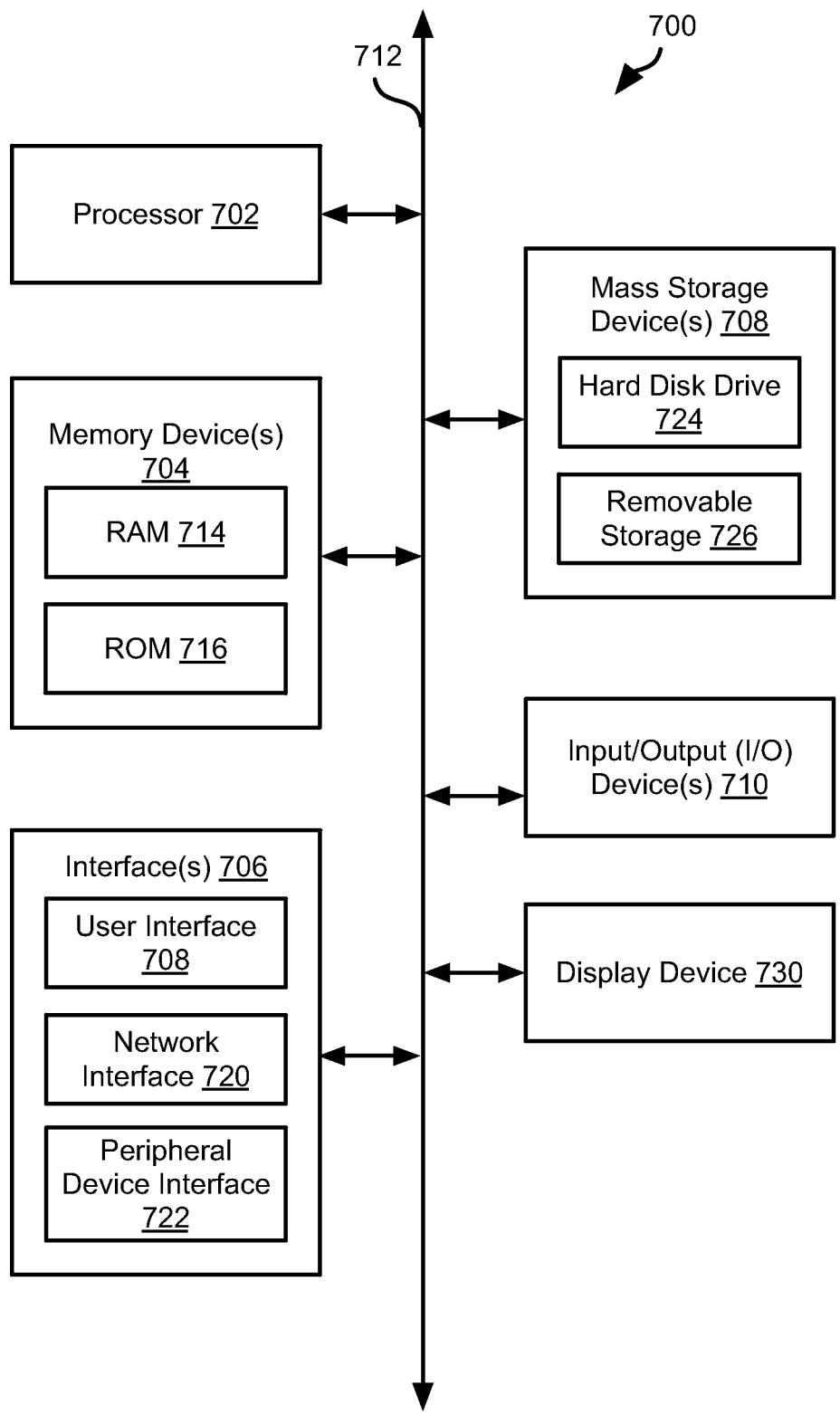
FIG. 7 is a schematic block diagram of a computer system suitable for implementing methods in accordance with embodiments of the present invention.

FIG. 7 is a block diagram illustrating an example computing device 700. Computing device 700 may be used to perform various procedures, such as those discussed herein. Computing device 700 can function as a server, a client, or any other computing entity. Computing device can perform various monitoring functions as discussed herein, and can execute one or more application programs, such as the application programs described herein. Computing device 700 can be any of a wide variety of computing devices, such as a desktop computer, a notebook computer, a server computer, a handheld computer, tablet computer and the like.

Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, etc.), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
    receiving, by a server system, a shopping list of a user;
    retrieving, by the server system, locations of items of the shopping list in a floor plan of a store and one or more characteristics of the items of the shopping list;
    ordering, by the server system, the items of the shopping list according to the locations of the items and the one or more characteristics of the items;
    evaluating, by the server system, video data of the store with movement of the user in the floor plan of the store;
    determining, by the server system, using the video data, locations and velocities of shoppers in the store with the movement of the user in the floor plan of the store;
    (a) identifying, by the server system, at least one of currently congested locations or expected congested locations according to the locations and the velocities of the shoppers in the store;
    (b) determining a traveling speed of the user along a path passing the locations of the items of the shopping list;
    (c) identifying a plurality of orderings of the shopping list;
    (d) scoring the plurality of orderings such that a score of each ordering of the plurality of orderings increases with increased similarity to an original ordering of the shopping list, decreases with increased length of the path passing the locations of the items of the shopping list, adjusts depending on the one or more characteristics of the items of the shopping list, and decreases with increased temporal or positional proximity to the at least one of the currently congested locations or the expected congested locations;
    (e) selecting one of the plurality of orderings having a highest score: and
    (f) re-ordering, by the server system, the items of the shopping list to adjust the path passing the locations of the items of the shopping list to avoid the at least one of the currently congested locations or the expected congested locations based on the traveling speed of the user, as determined, and the one of the plurality of orderings having the highest score.

2. The method of claim 1, wherein identifying the at least one of the currently congested locations or the expected congested locations according to the locations and the velocities of the shoppers in the store further comprises, for each shopper of the shoppers:
    determining from the video data whether the each shopper is or is not pushing a shopping cart; and
    characterizing each shopper's maneuverability according to whether the each shopper is or is not pushing the shopping cart.

3. The method of claim 2, further comprising, for the each shopper:
    determining an expected route of the each shopper according to the each shopper's maneuverability and the location and the velocity of the each shopper; and identifying, as the expected congested locations, those locations at which the expected routes of two or more shoppers of the shoppers meet a threshold physical proximity condition at an expected time.

4. The method of claim 3, wherein re-ordering the items of the shopping list to adjust the path passing the locations of the items of the shopping list to avoid the at least one of the currently congested locations or the expected congested locations comprises:

determining an ordering of the items such that, at the traveling speed of the user, as determined, the user will not be at the expected congested locations at the expected time of the expected congested locations when retrieving the items of the shopping list according to the re-ordering.

5. The method of claim 1, wherein re-ordering the items of the shopping list to adjust the path passing the locations of the items of the shopping list to avoid the at least one of the currently congested locations or the expected congested locations comprises:

determining the re-ordering of the items in combination with the re-ordering of items of a plurality of other shopping lists of other users in the store such that congestion in the store is reduced.

6. The method of claim 1, further comprising transmitting the re-ordering of the items of the shopping list to a mobile device of the user.

7. The method of claim 6, further comprising:
receiving, by the server system, notification of checking off of items of the shopping list from the mobile device of the user.

8. The method of claim 7, further comprising:
inferring, by the server system, a location of the mobile device of the user from a location in the floor plan of a most-recent item referenced in a most recent notification of checking off of the most-recent item.

9. The method of claim 7, further comprising:
inferring, by the server system, a velocity of the mobile device of the user from a difference in locations in the floor plan of two or more most-recent items referenced in two or more most recent notifications of checking off of a most-recent item and times at which the two or more most recent notifications were received.

10. The method of claim 1, further comprising periodically repeating (a), (b), (c), (d), (e), and (f) while the user remains in the store.

11. The method of claim 1, wherein the scoring the plurality of orderings such that the score of the each ordering of the plurality of orderings adjusts depending on the one or more characteristics of the items is selected from a group consisting of:

increasing the score of the each ordering of the plurality of orderings based on decreasing an amount of time that one or more refrigerated items are placed outside of refrigeration while the user is in the store;

decreasing the score of the each ordering of the plurality of orderings based on increasing the amount of time that the one or more refrigerated items are placed outside of the refrigeration while the user is in the store;

increasing the score of the each ordering of the plurality of orderings based on decreasing an amount of time that one or more items with one or more privacy considerations is in possession of the user while the user is in the store;

decreasing the score of the each ordering of the plurality of orderings based on increasing the amount of time that the one or more items with the one or more privacy considerations is in possession of the user while the user is in the store;

increasing the score of the each ordering of the plurality of orderings based on decreasing an amount of time between (a) the user entering the store and (b) one or more items in higher-than-average demand are in the possession of the user; and decreasing the score of the each ordering of the plurality of orderings based on increasing the amount of time between (y) the user entering the store and (z) the one or more items in higher-than-average demand are in the possession of the user.

12. A system comprising one or more processors and one or more memory devices operably coupled to the one or more processors and storing executable and operational data effective to cause the one or more processors to:

receive a shopping list of a user;
retrieve locations of items of the shopping list in a floor plan of a store and one or more characteristics of the items of the shopping list;
order the items of the shopping list according to the locations of the items and the one or more characteristics of the items;
evaluate video data of the store with movement of the user in the floor plan of the store;
determining, by a server system, using the video data, locations and velocities of shoppers in the store with the movement of the user in the floor plan of the store;
(a) identifying, by the server system, at least one of currently congested locations or expected congested locations according to the locations and the velocities of the shoppers in the store;
(b) determining a traveling speed of the user along a path passing the locations of the items of the shopping list;
(c) identifying a plurality of orderings of the shopping list;
(d) scoring the plurality of orderings such that a score of each ordering of the plurality of orderings increases with increased similarity to an original ordering of the shopping list, decreases with increased length of the path passing the locations of the items of the shopping list, adjusts depending on the one or more characteristics of the items of the shopping list, and decreases with temporal or positional proximity to the at least one of the currently congested locations or the expected congested locations;
(e) selecting one of the plurality of orderings having a highest score: and
(f) re-ordering, by the server system, the items of the shopping list to adjust the path passing the locations of the items of the shopping list to avoid the at least one of the currently congested locations or the expected congested locations based on the traveling speed, as determined, of the user and the one of the plurality of orderings having the highest score.

13. The system of claim 12, wherein the executable and operational data are further effective to cause the one or more processors to identify the at least one of the currently congested locations or the expected congested locations according to the locations and the velocities of the shoppers in the store by, for each shopper of the shoppers:

determining from the video data whether the each shopper is or is not pushing a shopping cart; and
characterizing each shopper's maneuverability according to whether the each shopper is or is not pushing the shopping cart.

14. The system of claim 13, wherein the executable and operational data are further effective to cause the one or more processors to:
 for the each shopper, determine an expected route of the each shopper according to the each shopper's maneuverability and a location and a velocity of the each shopper; and
 identify as the expected congested locations those locations at which expected routes of two or more shoppers of the shoppers meet a threshold physical proximity condition at an expected time.

15. The system of claim 14, wherein the executable and operational data are further effective to cause the one or more processors to re-order the items of the shopping list to adjust the path passing the locations of the items of the shopping list to avoid the at least one of the currently congested locations or the expected congested locations by:
 determining an ordering of the items such that, at the traveling speed of the user, as determined, the user will not be at the expected congested locations at the expected time of the expected congested locations when retrieving the items of the shopping list according to the re-ordering.

16. The system of claim 12, wherein the executable and operational data are further effective to cause the one or more processors to re-order the items of the shopping list to adjust the path passing the locations of the items of the shopping list to avoid the at least one of the currently congested locations or the expected congested locations by:
 determining the re-ordering of the items in combination with the re-ordering of items of a plurality of other shopping lists of other users in the store such that congestion in the store is reduced.

17. The system of claim 12, wherein the executable and operational data are further effective to cause the one or more processors to transmit the re-ordering of the items of the shopping list to a mobile device of the user.

18. The system of claim 17, wherein the executable and operational data are further effective to cause the one or more processors to:
 receive notification of checking off of the items of the shopping list from the mobile device of the user; and
 infer a location of the mobile device of the user from a location in the floor plan of a most-recent item referenced in a most recent notification of the checking off of the most-recent item.

19. The system of claim 12, wherein the executable and operational data are further effective to cause the one or more processors to periodically repeat (a), (b), (c), (d), (e), and (f) while the user remains in the store.

20. The system of claim 12, wherein the scoring the plurality of orderings such that the score of the each ordering of the plurality of orderings adjusts depending on the one or more characteristics of the items is selected from a group consisting of:
 increasing the score of the each ordering of the plurality of orderings based on decreasing an amount of time that one or more refrigerated items are placed outside of refrigeration while the user is in the store;
 decreasing the score of the each ordering of the plurality of orderings based on increasing the amount of time that the one or more refrigerated items are placed outside of the refrigeration while the user is in the store;
 increasing the score of the each ordering of the plurality of orderings based on decreasing an amount of time that one or more items with one or more privacy considerations is in possession of the user while the user is in the store;
 decreasing the score of the each ordering of the plurality of orderings based on increasing the amount of time the one or more items with the one or more privacy considerations is in possession of the user while the user is in the store;
 increasing the score of the each ordering of the plurality of orderings based on decreasing an amount of time between (a) the user entering the store and (b) one or more items in higher-than-average demand are in the possession of the user; and
 decreasing the score of the each ordering of the plurality of orderings based on increasing the amount of time between (y) the user entering the store and (z) the one or more items in higher-than-average demand are in the possession of the user.

21. A method comprising:
 receiving, by a server system, a shopping list of a user;
 retrieving, by the server system, locations of items of the shopping list in a floor plan of a store;
 ordering, by the server system, the items of the shopping list according to the locations of the items;
 evaluating, by the server system, video data of the store;
 determining, by the server system, using the video data, locations and velocities of shoppers in the store;
 identifying, by the server system, at least one of currently congested locations or expected congested locations according to the locations and the velocities of the shoppers in the store;
 determining, by the server system, a traveling speed of the user along a path passing the locations of the items of the shopping list;
 determining, by the server system, a re-ordering of the items of the shopping list in combination with a re-ordering of the items of other shopping lists of other users in the store such that congestion in the store is reduced;
 scoring, by the server system, one or more orderings of the items of each shopping list of each user in the store, the one or more orderings of the items comprising the re-ordering of the items of the shopping list and the re-ordering of the items of the other shopping lists; and
 re-ordering, by the server system, the items of the each shopping list of the each user in the store such that a sum of (a) a score of an ordering of the items of the shopping list of the user and (b) scores of other orderings of the items of the other shopping lists of the other users in the store exceeds a threshold score index thereby adjusting paths of the each user in the store passing the locations of the items of the each shopping list of the each user in the store to decrease an overlap of the paths passing the locations of the items of the each shopping list of the each user in the store at a common time and to avoid the at least one of the currently congested locations or the expected congested locations.

22. The method of claim 21, further comprising transmitting the re-ordering of the items of the shopping list to a mobile device of the user.

23. The method of claim 21, further comprising:
 inferring, by the server system, a location of the mobile device of the user from a location in the floor plan of a most-recent item referenced in a most recent notification of checking off of the most-recent item.

24. A system comprising one or more processors and one or more memory devices operably coupled to the one or more processors and storing executable and operational data effective to cause the one or more processors to:
- receive, by a server system, a shopping list of a user;
- retrieve, by the server system, locations of items of the shopping list in a floor plan of a store;
- order, by the server system, the items of the shopping list according to the locations of the items;
- evaluate, by the server system, video data of the store;
- determine, by the server system, using the video data, locations and the velocities of shoppers in the store;
- identify, by the server system, at least one of currently congested locations or expected congested locations according to the locations and the velocities of the shoppers in the store;
- determine, by the server system, a traveling speed of the user along a path passing the locations of the items of the shopping list;
- determine, by the server system, a re-ordering of the items of the shopping list in combination with a re-ordering of the items of other shopping lists of other users in the store such that congestion in the store is reduced;
- scoring, by the server system, one or more orderings of the items of each shopping list of each user in the store, the one or more orderings of the items comprising the re-ordering of the items of the shopping list and the re-ordering of the items of the other shopping lists; and
- re-order, by the server system, the items of the each shopping list of the each user in the store such that a sum of (a) a score of an ordering of the items of the shopping list of the user and (b) scores of other orderings of the items of the other shopping lists of the other users in the store exceeds a threshold score index thereby adjusting paths of the each user in the store passing the locations of the items of the each shopping list of the each user in the store to decrease an overlap of the paths passing the locations of the items of the each shopping list of the each user in the store at a common time and to avoid the at least one of the currently congested locations or the expected congested locations.

25. The system of claim 24, wherein the executable and operational data are further effective to cause the one or more processors to transmit the re-ordering of the items of the shopping list to a mobile device of the user.

26. The system of claim 25, wherein the executable and operational data are further effective to cause the one or more processors to:
- receive notification of checking off of the items of the shopping list from the mobile device of the user; and
- infer a location of the mobile device of the user from a location in the floor plan of a most-recent item referenced in a most recent notification of the checking off of the most-recent item.

* * * * *